Feb. 17, 1931.  E. F. BRUNNER  1,792,807
VEHICLE WHEEL MOUNTING
Filed Sept. 27, 1927
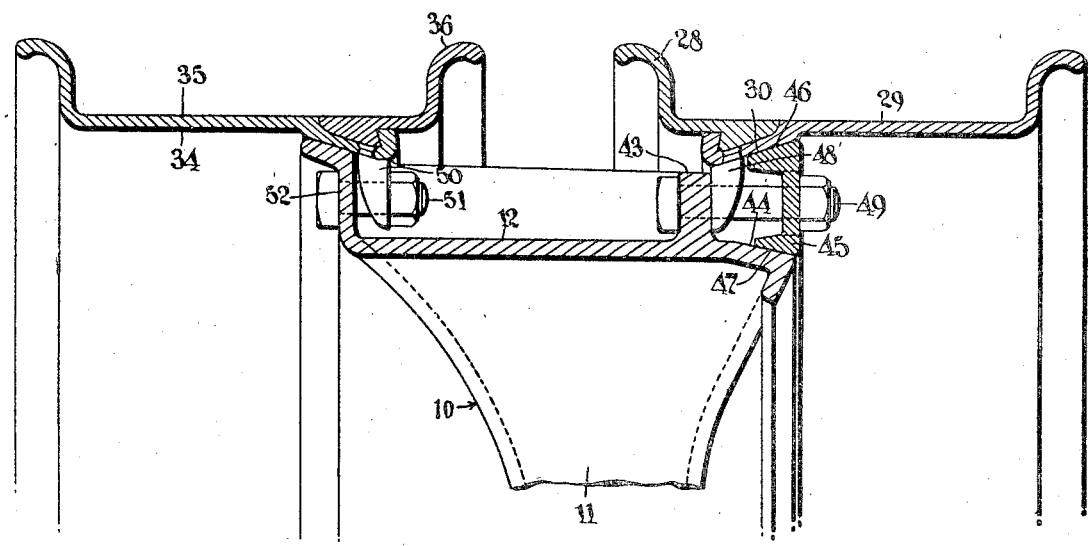
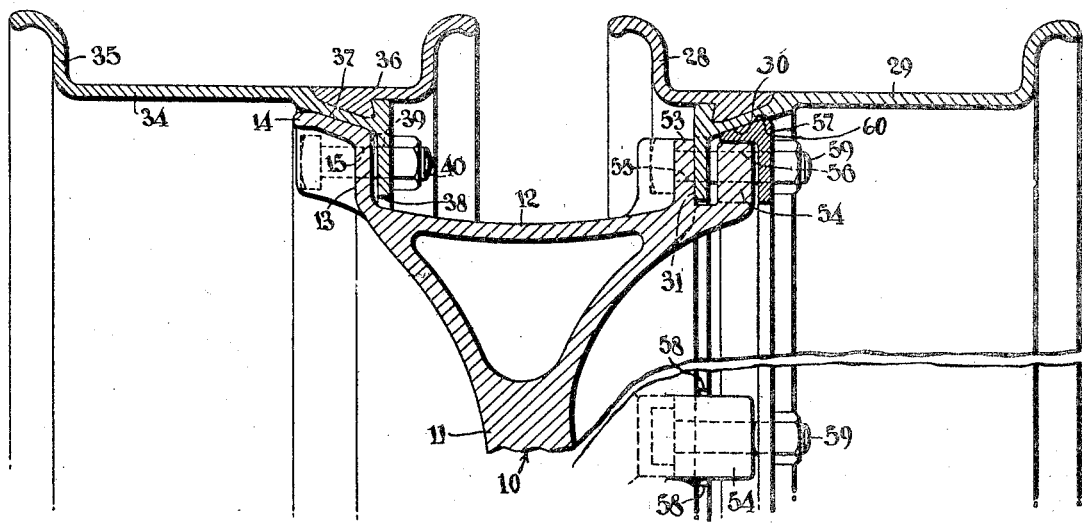
E. F. Brunner,
INVENTOR
ATTORNEY Patented Feb. 17, 1931

1,792,807

UNITED STATES PATENT OFFICE

ELMER F. BRUNNER, OF AKRON, OHIO, ASSIGNOR TO THE GOODYEAR TIRE & RUBBER COMPANY, OF AKRON, OHIO, A CORPORATION OF OHIO

VEHICLE WHEEL MOUNTING

Application filed September 27, 1927. Serial No. 222,267.

My invention relates to rim mountings for vehicle wheels and it has particular relation to so-called dual rim mountings, wherein a plurality of tire carrying rims are mounted upon a common felloe.

One object of my invention is to provide a simple, practical and inexpensive form of dual mounting.

A further object lies in the provision of novel means for securing the rims upon the wheel felloe.

Other objects and advantages to be derived from the practice of my invention will become apparent from a perusal of the following specification, in which two embodiments of the invention are described in detail, reference being had to the accompanying drawings, wherein:

Fig. 1 is a cross-sectional view illustrating one form which my invention may assume; and Fig. 2 is a cross-sectional view showing another form which my invention may assume.

Referring now to Figure 1 of the drawings, a wheel 10, preferably composed of cast metal, embodies spokes 11 and a felloe 12. The felloe 12 is provided adjacent its inner edge with a radially disposed flange 13, and an outwardly inclined rim-seating portion 14. The flange 13 is provided with a plurality of apertures 15 for the reception of rim securing means. Adjacent its outer edge, the felloe 12 is provided with radially disposed lugs 53 and 54, having aligned apertures 55 and 56, respectively. The lugs 54 which are disposed at the outer edge of the felloe 12, are circumferentially spaced and the lugs 53 are disposed in alignment with but spaced from the respective lugs 54, which arrangement provides a plurality of circumferentially spaced pairs of outwardly extending securing lugs.

The tire supporting rim used in conjunction with the structure above described comprises interfitting annular members 28 and 29. The member 29 is provided on its inner circumference with a tapered seating surface 30 and a radial apertured flange 31 extending inwardly from the surface 30. The rib 31 is broken away, as indicated at 58, at intervals corresponding to the intervals between the lugs on the felloe.

A ring 57 utilized in this form of the invention has an inclined peripheral face 60 upon which the seating portion 30 of the tire rim is adapted to rest. In the assembly of the parts, the rim is placed on the felloe in such position that the lugs are opposite the spaces which occur where the radial flange is broken away. The rim is then turned circumferentially until the apertures in the flange are brought into alignment with and between the apertures 55 and 56 in the lugs on the felloe, and then the parts are secured in assembled relation by means of bolts 59.

An inner tire rim 34 which is assembled first is also composed of interfitting annular members 35 and 36. The member 35 has a seating face 37, which is adapted to rest upon the inclined surface of the portion 14, and is provided with a radial flange 38 that engages the radially disposed flange 13. The apertures 15 are adapted to register with apertures 39 of the flange 38 and the rim is secured in proper position by means of bolts 40 passing through the apertures.

In the form of my invention shown by Fig. 2, the felloe 12 is provided on its periphery adjacent its outer edge with a plurality of radially disposed lugs 43. The extreme outer portion of the felloe is inclined, as indicated at 44. A ring 45 employed in conjunction with this construction is formed with radially spaced converging surfaces 46 and 47. The outer tire rim 28—29 is provided with a plurality of lugs 48 extending radially inwardly from the inclined seating surface 30 thereof, which are adapted to be aligned with the lugs 43 on the felloe and are secured together by means of bolts 49 passing therethrough and through apertures in the ring 45.

The rim 34 shown by this figure is provided with lugs 50 that are bolted, as indicated at 51, to a radial flange 52 similarly to the manner in which the flange 38 is secured to the flange 13.

From the foregoing description it will be apparent that my invention provides a simple and practical form of dual wheel mounting. Although I have described but the preferred forms of the invention and have described those forms in detail it will be apparent to those skilled in the art that various modifications and changes may be made therein without departing from the spirit of the invention or from the scope of the appended claims.

What I claim is:

1. A vehicle wheel assembly comprising a substantially cylindrical felloe band, circumferentially spaced lugs extending radially from the band, securing lugs on the band in alignment with but spaced from said spaced lugs, a rim formed with radially inwardly extending elements for coaction with the securing lugs, a wedge ring, and means for positioning the ring in engagement with said spaced lugs and the rim.

2. A vehicle wheel assembly comprising a substantially cylindrical felloe band, circumferentially spaced lugs extending radially from the band, securing lugs on the band in alignment with but spaced from said spaced lugs, a rim formed with a tapered seating surface and radially inwardly extending elements for coaction with the securing lugs, a wedge ring, and means for positioning the ring in engagement with said spaced lugs and the tapered seating surface.

3. A vehicle wheel assembly comprising a felloe having a substantially cylindrical felloe band, a plurality of pairs of spaced aligned apertured lugs adjacent one edge of the felloe, a tire rim having radially inwardly extending lugs for registry with the respective lugs on the felloe, a wedge ring engaging one lug of each pair, and means traversing the ring and lugs to position the rim with the lugs thereon in engagement with the other lug of each pair of lugs on the felloe.

4. A wheel assembly comprising a substantially cylindrical felloe band, circumferentially spaced pairs of lugs extending radially from the band, a rim formed with securing elements disposed between the lugs of each pair, a wedge ring engaging the outer lug of each pair, and means for securing the wedge ring in position.

5. A dual rim supporting felloe comprising a base, an inclined rim supporting seat at one side thereof, a series of circumferentially spaced lugs at the other side of the felloe, and a second series of circumferentially spaced lugs spaced laterally with respect to the first series, the lugs of one series having openings aligned with openings in the lugs of the other series.

6. A vehicle wheel assembly comprising a substantially cylindrical felloe band, circumferentially spaced lugs extending outwardly from the band, a rim formed with a tapered seating surface having a radius larger than the distance from the center of the wheel to the outer surface of the lugs, securing elements extending radially inwardly from one circumferentially extending edge of the seating surface for coaction with the respective lugs, and clamping means formed with surfaces for engagement with the tapered seating surface and the felloe respectively.

7. A vehicle wheel assembly comprising a substantially cylindrical felloe band, circumferentially spaced lugs extending outwardly from the band, a rim supporting surface at one side of the lugs, a rim formed with a tapered seating surface having a radius larger than the distance from the center of the wheel to the outer surface of the lugs, securing elements extending radially inwardly from one circumferentially extending edge of said surface for coaction with the respective lugs, and clamping means formed with surfaces for engagement with the tapered seating surface and the felloe respectively, said means including bolts engaging the lugs and elements for securing the rim in position.

In witness whereof, I have hereunto signed my name.

Signed at Akron, in the county of Summit, and State of Ohio, this 26th day of September, 1927.

ELMER F. BRUNNER.